United States Patent [19]
Kurihara

[11] Patent Number: 5,150,352
[45] Date of Patent: Sep. 22, 1992

[54] INFORMATION RECORDING AND REPRODUCING APPARATUS HAVING AN EMERGENCY CONVEYING DEVICE FOR MOVING A CARRIAGE MEMBER TO AN EJECTING PORT

[75] Inventor: Hideo Kurihara, Tokyo, Japan
[73] Assignee: Canon Kabushiki Kaisha, Tokyo, Japan
[21] Appl. No.: 412,333
[22] Filed: Sep. 26, 1989
[30] Foreign Application Priority Data
Sep. 27, 1988 [JP] Japan .................. 63-241881
[51] Int. Cl.$^5$ .............. G06K 13/00; G06K 13/06
[52] U.S. Cl. ....................... 369/258; 360/2; 235/475; 235/479
[58] Field of Search ............ 369/258, 77.1, 77.2, 369/215, 219; 235/377, 379, 479, 476, 454, 487, 475, 482; 360/2

[56] References Cited
U.S. PATENT DOCUMENTS

| | | | |
|---|---|---|---|
| 3,921,969 | 11/1975 | Hickey et al. | 235/479 X |
| 4,150,784 | 4/1979 | Moorman et al. | 235/479 |
| 4,575,703 | 3/1986 | Shishido | 235/479 |
| 4,650,976 | 3/1987 | Hiraishi | 235/377 |
| 4,734,794 | 3/1988 | Mehnert et al. | 235/479 X |
| 4,788,677 | 11/1988 | Ikedo et al. | 369/215 X |
| 4,914,647 | 4/1990 | Ono et al. | 369/244 X |

FOREIGN PATENT DOCUMENTS 63-204384 8/1988 Japan .
63-285760 11/1988 Japan .................. 369/258

Primary Examiner—Stuart S. Levy
Assistant Examiner—Joseph A. Rhoa
Attorney, Agent, or Firm—Fitzpatrick, Cella, Harper & Scinto

[57] ABSTRACT

An information recording and reproducing apparatus according to the invention includes an emergency conveying device for conveying an information recording medium on a carriage member from an information recording and/or reproducing position to an ejecting port. The emergency conveying device includes a device for moving the carriage member to the ejecting port by coming into engagement with the carriage member. A gear (20) is manually actuated in case of a power failure so as to manually move the carriage (3) toward the discharge area.

4 Claims, 3 Drawing Sheets

INFORMATION RECORDING AND REPRODUCING APPARATUS HAVING AN EMERGENCY CONVEYING DEVICE FOR MOVING A CARRIAGE MEMBER TO AN EJECTING PORT

BACKGROUND AND SUMMARY OF THE INVENTION

The present invention relates to an information recording and reproducing apparatus for recording and/or reproducing information by using a card-shaped information recording medium.

Hitherto, various types of recording media such as optical card, an optical disk, optical tape, etc. have been known as recording media which are used to record information by using a light beam and to reproduce the recorded information by using a light beam. Among them, a large demand for of the optical card has arisen as a recording medium which can be easily manufactured and is easily portable and in which the accessing efficiency is good. In the case of the optical card, a plurality of information tracks are rectilinearly formed and arranged in parallel in a predetermined area on the surface of the card. Therefore, in an information recording and reproducing apparatus using an optical card as a recording medium, a light beam spot relatively continuously moves on the surface of the optical card in the direction of an information track and records and/or reproduces information. After the light beam spot is moved by a predetermined distance, it relatively moves by only a predetermined distance in the direction perpendicular to the track and shifts to another track. The relative movement in the direction of the track and the relative movement in the direction perpendicular to the track are again alternately repeated only a predetermined number of times. Information is recorded on and/or reproduced from the optical card by such a movement of the light beam spot.

However, in the conventional information recording and reproducing apparatus, if an accident such as a general failure, a power failure, or the like occurs, in order to take out an optical card which has been loaded in the apparatus, a cover or the like of the apparatus main body is removed and, thereafter, the optical card must be taken out, so that the operations become extremely complicated. On the other hand, in such operations, there is also a case wherein the apparatus or optical card is damaged. Therefore, there has been proposed an information recording and reproducing apparatus having a mechanism to manually take out an optical card from the inside of the apparatus (JP-A-63-204384). According to such an apparatus, a rotating shaft of a rotating drive source such as a rotary DC motor or the like and a transfer mechanism section are manually driven through a transfer mechanism such as a rubber roller, belt, gear, and the like.

However, for instance, when a voice coil type linear motor is used as a drive source to convey the optical card, since the drive source directly conveys the optical card, it is impossible to execute the manual operation mentioned above.

It is an object of the invention to provide an information recording and reproducing apparatus in which even if an electric power supply from the outside has stopped due to a power failure, a general failure, or the like, an information recording medium loaded in the apparatus can be taken out.

According to the invention, the above object is accomplished by an information recording and reproducing apparatus having emergency conveying means for conveying an information recording medium on a carriage member from the position to record and/or reproduce information to an ejecting port, wherein the emergency conveying means includes means for moving the carriage member to the ejecting port by coming into engagement with the carriage member.

DESCRIPTION OF THE PREFERRED EMBODIMENTS

Figure 1:
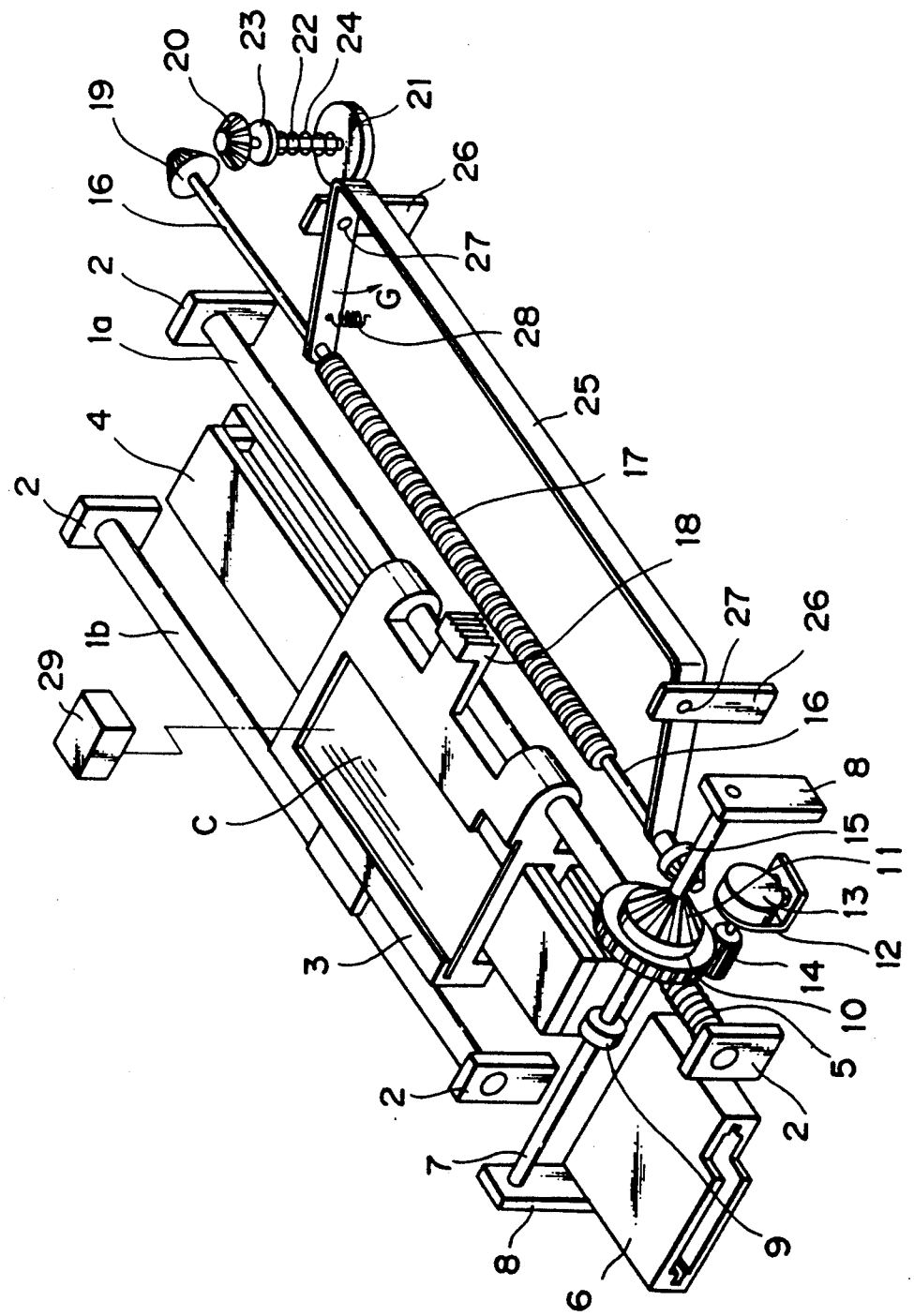
FIG. 1 is a perspective view of the first embodiment of an information recording and reproducing apparatus according to the invention.

The present invention will be described in detail hereinbelow with respect to embodiments shown in the drawings.

FIG. 1 shows a first embodiment of the invention. Both ends of each of two parallel guide shafts 1a and 1b are fixed to an apparatus main body by attaching members 2. A shuttle 3 for holding and conveying an optical card C as an information recording medium is slidably supported on the guide shafts 1a and 1b. Although not shown, a coil is attached under the shuttle 3 and is arranged as a pair together with a rectangular yoke 4 located below the shuttle 3, thereby forming a voice coil type linear motor. The shuttle 3 is driven by such a linear motor along the guide shafts 1a and 1b. The voice coil type linear motor moves the shuttle 3 without using a transfer mechanism such as a rubber roller, belt, gear, and the like. On the other hand, the voice coil type linear motor directly moves the shuttle 3 by the drive source.

Lengths of the edge portions of the two guide shafts 1a and 1b on the side where the optical card C is inserted or ejected are different. A spring 5 serving as a rubber member is wound around an edge portion of the long guide shaft 1a. An inserting/ejecting port 6 of the optical card C is provided in front of the shuttle 3. A rotating shaft 7 is arranged between the shuttle 3 and the inserting/ejecting port 6 in the direction perpendicular to the guide shafts 1a and 1b. The rotating shaft 7 is provided to supply the optical card C from the inserting/ejecting port 6 to the shuttle 3 or to take out the optical card C from the shuttle 3. The rotating shaft 7 is rotatably attached to the main body by two bearing members 8. A rubber roller 9 for loading the optical card C is attached at the position of the rotating shaft 7 corresponding to the unrecorded portion of the optical card C. A spur gear 10 for driving and a bevel gear 11 are attached to the intermediate portion of the rotating shaft 7. A motor 13 is fixed to the main body by a fixing member 12. The driving spur gear 10 transfers the rotation of the motor 13 to the rotating shaft 7 via a pinion gear 14. Another bevel gear 15 can come into engagement with the bevel gear 11. A rotating shaft 16 fixed to the bevel gear 15 is arranged in parallel with the guide shafts 1a and 1b. A lead screw 17 is provided at an intermediate portion of the rotating shaft 16 and can come into engagement with a rack gear 18 which is formed integrally with the shuttle 3. Further, a bevel gear 19 is attached to the edge portion of the rotating shaft 16 on the side opposite to the bevel gear 15 and can come into engagement with a bevel gear 20. The bevel gear 20 is attached to one edge portion of a rotating shaft 22 which is arranged in the vertical direction and in which an emergency ejecting knob 21 is attached to the other end. The rotating shaft 22 is vertically movably attached to a fixed bearing member 23. A return spring 24 is wound around the rotating shaft 22. The bearing member 23 slidably and rotatably supports the rotating shaft 22 and also functions as a stopper of the return spring 24. On the other hand, a U-shaped arm member 25 is attached to the rotating shaft 16. The arm member 25 functions so as to depress the rotating shaft 16. The arm member 25 functions so as to depress the rotating shaft 16 in the direction of an arrow G around fulcrums 27 of two fixing members 26 as rotational centers. The rotating shaft 16 is always urged downwardly by a spring 28. Further, an optical head 29 for recording and/or reproducing information to/from an information recording medium is arranged over the shuttle 3 and is movable in the direction perpendicular to the sliding direction of the shuttle 3.

In the above construction, in an ordinary recording and/or reproducing mode, as shown in FIG. 1, the ejecting knob 21 has been downwardly moved by the elastic force of the return spring 24. On the other hand, the rotating shaft 16 has been downwardly moved by the tensile force of the spring 28. The bevel gears 15 and 19 and lead screw 17 are now in the state in which they are removed from the bevel gears 11 and 20 and rack gear 18. The optical card C mounted on the shuttle 3 reciprocates in the forward and backward directions along the guide shafts 1a and 1b together with the shuttle 3 by the driving of the linear motor. Information is recorded and/or reproduced by the relative movement with the optical head 29.

When the shuttle 3 is moved by the driving of the linear motor and information is recorded and/or reproduced to/from the information recording medium, the lead screw 17 is removed from the rack gear 18. Therefore, the moving means which comes into engagement with the shuttle 3 and moves the shuttle 3 to the ejecting port of the apparatus does not operate.

Figure 2:
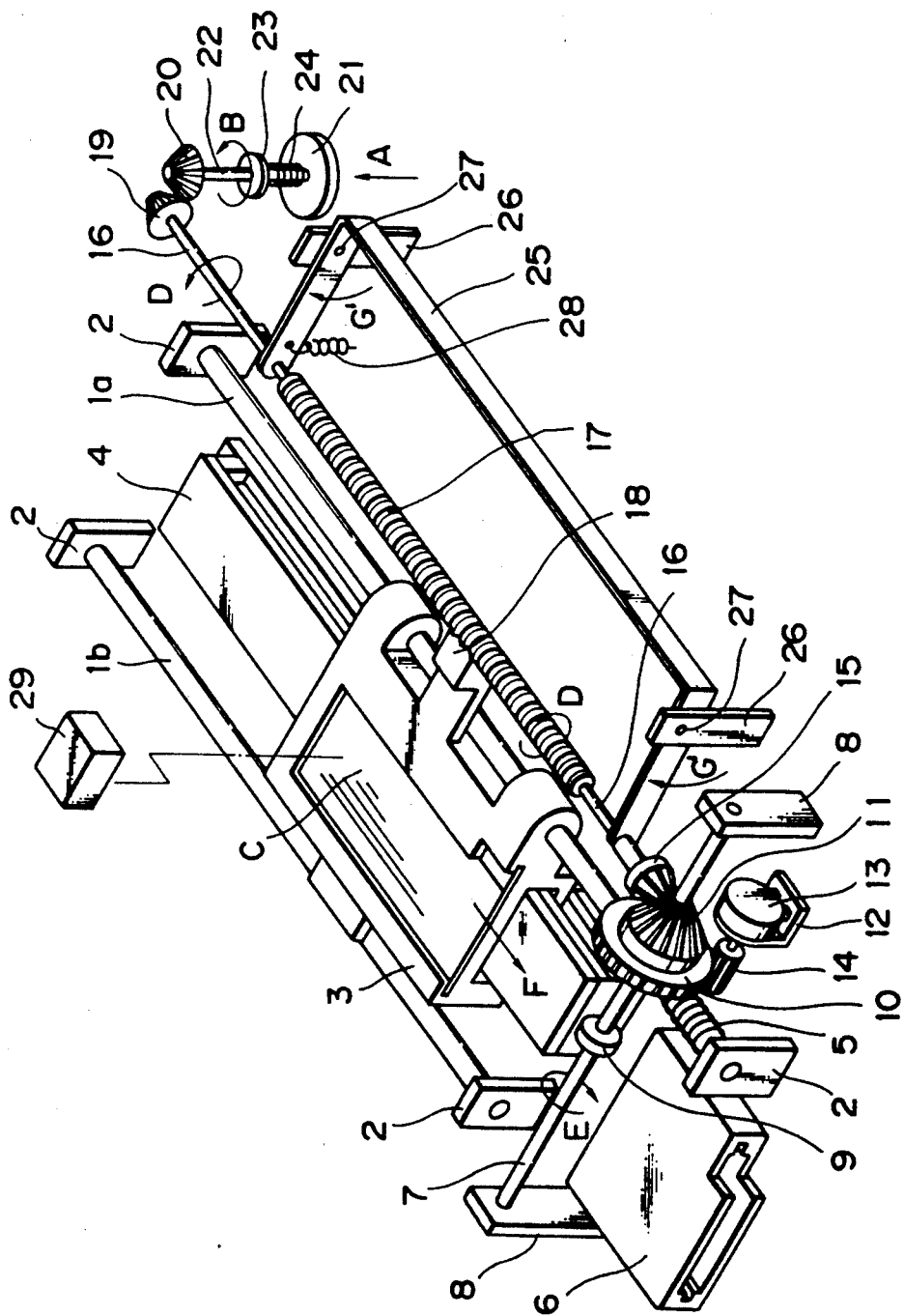
FIG. 2 is a perspective view showing an operative state upon an emergency condition of the information recording and reproducing apparatus shown in FIG. 1.

If a failure, a general power failure, or the like of the apparatus occurs and the electric power supply to the linear motor shuts off and the shuttle 3 does not move due to the linear motor, the moving means which comes into engagement with the shuttle 3 and moves the shuttle 3 to the ejecting port is made operative. As shown in FIG. 2, the ejecting knob 21 is manually pushed up in the direction of an arrow A from outside of the apparatus and, further, the knob 21 is rotated in the direction of an arrow B. Thus, the bevel gear 20 comes into engagement with the bevel gear 19 and also pushes up the rotating shaft 16 and arm member 25 in the direction of an arrow G', thereby allowing the lead screw 17 to come into engagement with the rack gear 18 and also allowing the bevel gear 15 to come into engagement with the bevel gear 11. Further, the rotating shaft 16 rotates in the direction of an arrow D due to the rotation of the bevel gear 20, thereby moving the shuttle 3 in the direction of an arrow F which is parallel to the moving direction of the shuttle by the linear motor and also rotating the rotating shaft 7 in the direction of an arrow E. The shuttle 3 stops moving at a predetermined position at which the rack gear 18 has reached the edge portion of the lead screw 17. The optical card C comes into contact with the rotating rubber roller 9 and is taken out of the shuttle 3 due to the frictional force with the rubber roller 9. Then, the optical card C is led to the inserting/ejecting port 6 and is ejected out of the apparatus.

The moving means which comes into engagement with the shuttle 3 and moves the shuttle 3 to the ejecting port can be made operative by the ejecting knob 21 from outside of the apparatus. On the other hand, since the moving means can be manually operated, it operates even if electric power is not supplied from the outside.

In the embodiment, the rack gear 18 has been used as a projecting part fixed to the shuttle 3. However, it is also possible to use a half nut or a pin which is matched with the lead angle of the lead screw 17 in place of the rack gear 18.

On the other hand, when the apparatus is shipped or the like, the rack gear 18 and lead screw 17 also can be used as a stopper of the shuttle 3. That is, in a case when the electric power supply to the linear motor was shut off upon shipping of the apparatus or the like and the shuttle 3 did not move due to the linear motor, there is a concern that the shuttle 3 spontaneously moves due to the vibration or the like from the outside and comes into contact with the attaching members 2 or the like and is damaged. To prevent such a problem, when the linear motor does not operate, by pushing up the ejecting knob 21 from outside of the apparatus as shown in FIG. 2, the lead screw 17 comes into engagement with the rack gear 18 and the shuttle 3 is locked at a predetermined position.

Figure 3:
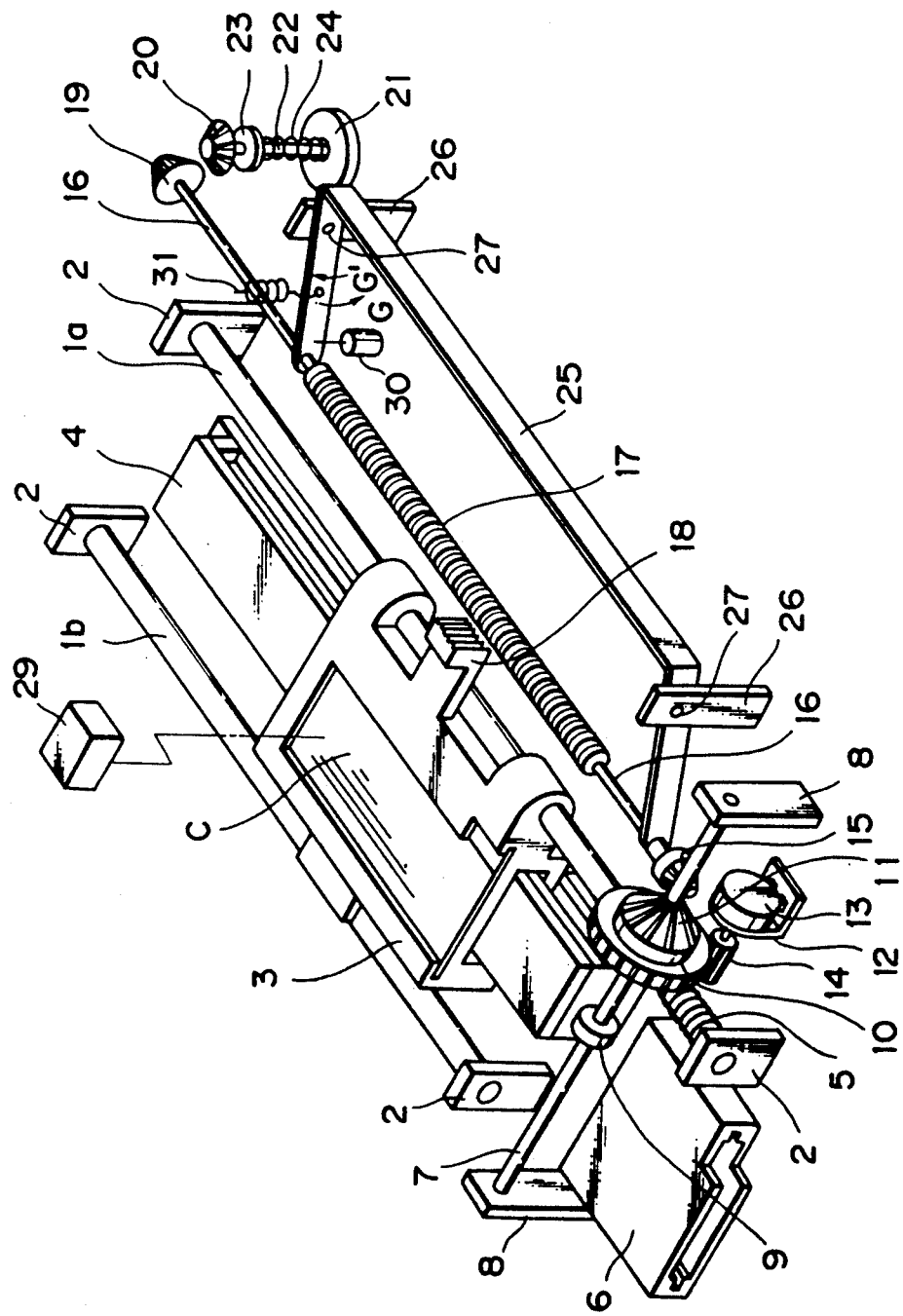
FIG. 3 is a perspective view of another embodiment of an information recording and reproducing apparatus according to the invention.

Further, the above-mentioned locking mechanism also can be made operative interlockingly with the turn-on or turn-off of the power supply to the apparatus. FIG. 3 shows such an example. A fundamental construction of an information recording and reproducing apparatus shown in FIG. 3 is similar to that of the apparatus shown in FIG. 1 and the similar parts and components are designated by the same reference numerals and their descriptions are omitted. When the power supply to the apparatus is started, the arm member 25 is pulled by a solenoid 30 in the direction of an arrow G, thereby releasing the locking mechanism of the shuttle 3. On the contrary, when the power supply to the apparatus is shut off, the arm member 25 is pulled by the spring 31 in the direction of an arrow G', thereby making the locking mechanism of the shuttle 3 operative.

Although the embodiments have been described with respect to an example of a card-shaped information recording medium, in the invention, the shape of the information recording medium is not particularly limited to the card shape.

As described above, the information recording and reproducing apparatus according to the invention includes a mechanism which can move the carriage member of the information recording medium even if the power supply from the outside has been shut off, so that the information recording medium can be ejected out at the time of an emergency. On the other hand, when executing an ordinary information recording or reproducing operation, the moving mechanism can be removed and can be made inoperative. Thus, a vain driving force is not needed.

What is claimed is:

1. An optical information recording/reproducing apparatus for effecting at least one of recording of information on and reproducing of information from a card-like information recording medium by use of a light beam, said apparatus comprising:

an opening through which the information recording medium can be inserted into and ejected form said apparatus;

a driving roller for conveying the information recording medium inserted through said opening into said apparatus;

a rotary motor for rotationally driving said driving roller by a driving force;

a driving transmission mechanism for transmitting the driving force of said rotary motor to said driving roller;

holding means for receiving the information recording medium conveyed by said driving roller and for holding the information recording medium;

an engaging section provided on said holding means;

an optical head for effecting at least one of recording of information on and reproducing of information from the information recording medium;

a linear motor for moving said holding means relative to said optical head; and manual driving means adapted to come into engagement with said engaging section of said holding means and said driving transmission mechanism to rotationally drive said driving roller and to move said holding means relative to said optical head by a manual operation from outside of said apparatus, wherein said manual driving means is retractably provided against said driving transmission mechanism and said holding means so that when said driving transmission mechanism transmits the driving force of said rotary motor to said driving roller and said holding means is being moved by said linear motor, said manual driving means is retracted to a position away from said engaging section of said holding means and said driving transmission mechanism, and when said linear motor is rendered inoperative due to an abnormal condition, said manual driving means is caused to come into engagement with said driving transmission mechanism and said engaging section of said holding means to be driven by a manual operation from outside of said apparatus, thereby rotationally driving said driving roller in an ejecting direction and moving said holding means toward said opening to eject said information recording medium form said apparatus.

2. An apparatus according to claim 1, wherein said manual driving means comprises a lead screw.

3. An apparatus according to claim 2, further comprising a rotation mechanism for rotating said lead screw by the manual driving force from outside of said apparatus, and said rotation mechanism comprises means for converting the manual driving force into a rotational force for rotating said lead screw when a rotating force is manually applied to said rotation mechanism from outside of said apparatus.

4. An apparatus according to claim 3, wherein said lead screw is pivotably provided in said apparatus, and the movement of said lead screw from the retracted position to the engaging position with said driving transmission mechanism and said holding means is effected by moving said rotation mechanism in the pivoting direction of said lead screw from outside of said apparatus.

* * * * *

UNITED STATES PATENT AND TRADEMARK OFFICE
CERTIFICATE OF CORRECTION

PATENT NO. : 5,150,352

DATED : September 22, 1992

INVENTOR(S) : Hideo Kurihara

It is certified that error appears in the above-identified patent and that said Letters Patent is hereby corrected as shown below:

COLUMN 5

Line 10, "form" should read --from--.

COLUMN 6

Line 16, "form" should read --from--.

Signed and Sealed this

Twenty-eighth Day of September, 1993

Attest:

BRUCE LEHMAN

Attesting Officer    Commissioner of Patents and Trademarks